(12) United States Patent
Liu et al.

(10) Patent No.: US 8,614,849 B2
(45) Date of Patent: Dec. 24, 2013

(54) THERMOCHROMATIC DEVICE AND THERMOCHROMATIC DISPLAY APPARATUS

(75) Inventors: Peng Liu, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 334 days.

(21) Appl. No.: 12/884,641

(22) Filed: Sep. 17, 2010

(65) Prior Publication Data

US 2011/0149372 A1    Jun. 23, 2011

(30) Foreign Application Priority Data

Dec. 18, 2009    (CN) .......................... 2009 1 0189149

(51) Int. Cl.
*G02F 1/01*    (2006.01)
(52) U.S. Cl.
USPC ........................................................ 359/288
(58) Field of Classification Search
USPC ........................................................ 359/288
See application file for complete search history.

(56) References Cited

U.S. PATENT DOCUMENTS

| | | | |
|---|---|---|---|
| 6,369,793 B1 * | 4/2002 | Parker ............................ 345/107 |
| 2004/0042172 A1 | 3/2004 | Kusaka et al. | |
| 2005/0236948 A1 * | 10/2005 | Hayashi et al. ................... 313/46 |
| 2008/0170982 A1 | 7/2008 | Zhang et al. | |
| 2009/0096348 A1 | 4/2009 | Liu et al. | |
| 2009/0268149 A1 | 10/2009 | Liu et al. | |
| 2009/0323475 A1 | 12/2009 | Jiang et al. | |
| 2010/0126985 A1 | 5/2010 | Feng et al. | |

FOREIGN PATENT DOCUMENTS

| | | |
|---|---|---|
| CN | 1493949 | 5/2004 |
| CN | 101437663 | 5/2009 |
| CN | 101605409 | 12/2009 |
| JP | 2-39189 | 2/1990 |
| JP | 6-274107 | 9/1994 |
| JP | 2009-94074 | 4/2009 |
| JP | 2009-265673 | 11/2009 |
| JP | 2009-296591 | 12/2009 |
| KR | 20080070204 | 7/2008 |

* cited by examiner

*Primary Examiner* — James Jones
(74) *Attorney, Agent, or Firm* — Altis Law Group, Inc.

(57) ABSTRACT

A thermochromatic device includes an insulating substrate, a back color layer, a color element, a heating element, a first electrode, and a second electrode. The back color layer is located on the insulating substrate. The color element is located on the back color layer and includes a transparence-changeable material. The transparence-changeable material performs a transformation between a transparent state and a nontransparent state at a phase change temperature. The heating element is located adjacent to the color element and includes a carbon nanotube structure. The first electrode and the second electrode are electrically connected to the heating element. A thermochromatic display apparatus using the thermochromatic device is also related.

20 Claims, 13 Drawing Sheets

ThERMOCHROMATIC DEVICE AND
THERMOCHROMATIC DISPLAY
APPARATUS

CROSS-REFERENCE TO RELATED
APPLICATIONS

This application claims all benefits accruing under 35 U.S.C. §119 from China Patent Application No. 200910189149.8, filed on Dec. 18, 2009 in the China Intellectual Property Office, disclosure of which is incorporated herein by reference. This application is related to applications entitled, "THERMOCHROMATIC DEVICE AND THERMOCHROMATIC DISPLAY APPARATUS", filed Sep. 17, 2010 Ser. No. 12/884,627; and "THERMOCHROMATIC DEVICE AND THERMOCHROMATIC DISPLAY APPARATUS", filed Sep. 17, 2010 Ser. No. 12/884,651.

BACKGROUND

1. Technical Field

The present disclosure relates to a thermochromatic device and thermochromatic display apparatus using the same.

2. Description of Related Art

Thermochromatic materials are materials that can change their color in response to changes in temperature. Thermochromatic materials can be used to make a thermochromatic device.

A thermochromatic device, according to the prior art usually includes a support substrate, a thermochromatic material layer located on a surface of the support substrate, and a heater. The heater is used to heat the thermochromatic material layer. The heater is usually made of ceramics, conductive glasses or metals. However, a color change speed of the thermochromatic device is slow because of the relatively high heat capacity per unit and slow heating speed of the heater.

What is needed, therefore, is to provide a thermochromatic device having an improved color change speed and thermochromatic display apparatus using the same.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

References will now be made to the drawings to describe, in detail, various embodiments of the present thermochromatic device and thermochromatic display apparatus using the same.

Figure 1:
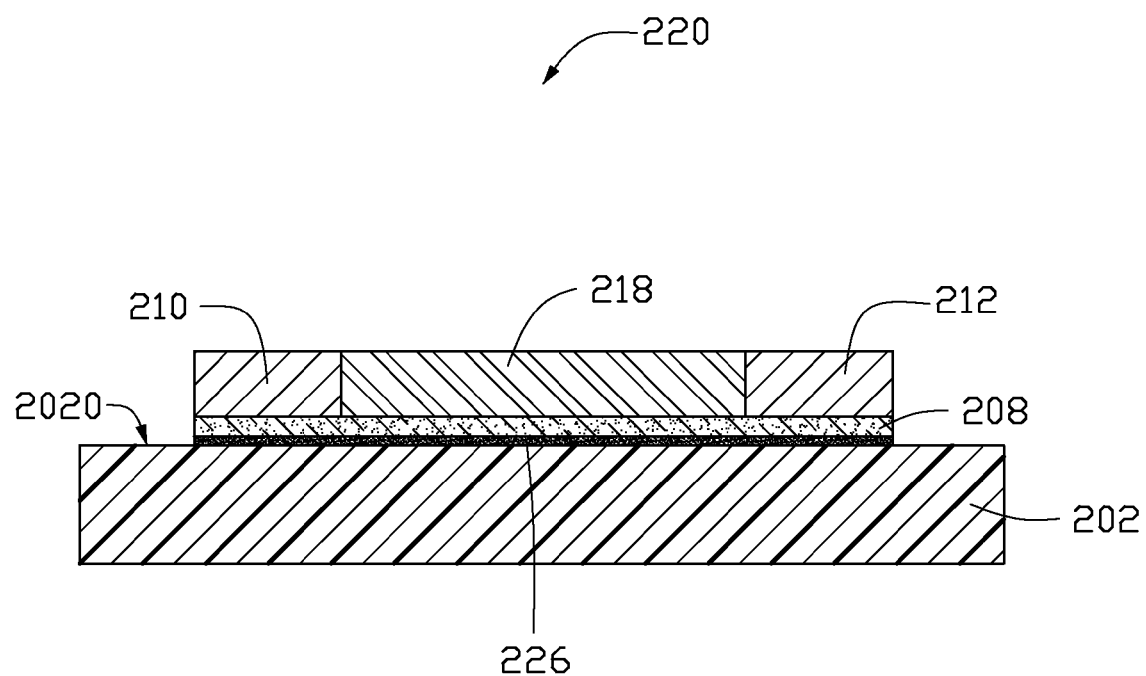
FIG. 1 is a schematic view of one embodiment of a thermochromatic device.

Referring to FIG. 1, a thermochromatic device 220 of a first embodiment includes an insulating substrate 202, a back color layer 226, a heating element 208, a first electrode 210, and a second electrode 212.

The insulating substrate 202 has a surface 2020. The back color layer 226 is located on the surface 2020 of the insulating substrate 202. The color element 218 is located on the surface 2020 of the back color layer 226. The heating element 208 is located adjacent to the color element 218 and configured to heat the color element 218. The heating element 208 can be located substantially adjacent to, about, above, on, or under the color element 218. Any arrangement can be made just as long as the heating element 208 can heat the color element 218. The first electrode 210 and the second electrode 212 are located apart from each other and electrically connected to the heating element 208. In one embodiment, both the heating element 208 and the color element 218 are layered structures. The heating element 208 is located between the back color layer 226 and the color element 218, and it covers the back color layer 226. The first electrode 210 and the second electrode 212 are located respectively on a surface of the heating element 208 and at the two opposite sides of the heating element 208. The color element 218 is located on a surface of the heating element 208 and between the first electrode 210 and the second electrode 212.

The insulating substrate 202 may be made of rigid material or flexible material. The rigid material may be ceramic, glass, quartz, resin, silicon, silicon dioxide, diamond, or alumina. The flexible material may be flexible polymer, fiber, or synthetic paper. The flexible polymer can be polyethylene terephthalate (PET), polycarbonate (PC), polyethylene (PE), or polyimide (PI). When the insulating substrate 202 is made of flexible material, the thermochromatic device 220 can be folded into random shapes during use. The melting point of the insulating substrate 202 is equal to or higher than 200° C. A size and a thickness of the insulating substrate 202 can be chosen according to need. In one embodiment, the insulating substrate 202 is a PET film with a thickness of about 1 millimeter.

The back color layer 226 can be a layer of any color material, such a white or black. The color of the back color layer 226 will not change with the temperature change at a temperature below 200° C. The thickness of the back color layer 226 is in a range from about 1 micrometer to about 100 micrometers. The back color layer 226 can be formed by printing, spraying, coating, or sputtering.

The color element 218 is made of transparence-changeable material which can perform a transformation between the transparent state and nontransparent state at a phase change temperature. When the color element 218 is transparent, the thermochromatic device 220 can show the color of the back color layer 226. When the color element 218 is nontransparent, the thermochromatic device 220 does not display any color. The phase change temperature of the transparence-changeable material is below 200° C. In one embodiment, the phase change temperature of the transparence-changeable material is in a range from about 40° C. to about 100° C. so that the thermochromatic device 220 can work at room temperature using a low working voltage. The present disclosure provides three groups of transparence-changeable materials as follows, respectively named first transparence-changeable material, second transparence-changeable material, and third transparence-changeable material.

The first transparence-changeable material is a mixture of polymer and fatty acid. The working principle of the first transparence-changeable material is described as follows. The crystals of the first transparence-changeable material are in dispersed state in a certain temperature range. The crystal size of the first transparence-changeable material can perform a reversible change as the temperature changes. The light transmissivity of the first transparence-changeable material having different crystal size is different, so the first transparence-changeable material can perform a transformation between the transparent state and nontransparent state. In one embodiment, the first transparence-changeable material can be a mixture of vinylidene chloride acrylonitrile copolymer and eicosanoids, a mixture of butadiene styrene copolymer and stearic acid, or a mixture of vinyl chloride vinyl acetate copolymer and stearic acid.

In one embodiment, the color element 218 may be made by the following steps:

dissolving a vinylidene chloride acrylonitrile copolymer and an eicosanoids in a tetrahydrofuran (THF) to form a mixture;

coating the mixture on a surface of the heating element 208; and drying the mixture to form a color element 218.

The color element 218 made of the mixture of vinylidene chloride acrylonitrile copolymer, and eicosanoids, is white and nontransparent. When the color element 218 is heated to about 74° C. by a heat write pulse, it becomes transparent and colorless. Thus, the thermochromatic device 220 can show the color of the back color layer 226. When the color element 218 is heated to about 63° C. by a heat erase pulse, it becomes white nontransparent again. Thus, the color of the thermochromatic device 220 is erased. Because the heat pulse is short and the color element 218 will cool down to room temperature rapidly, the transparent and colorless state and the white and nontransparent state can remain at room temperature. Thus, a bistable display can be achieved. The bistable display means that a display does not require any outside energy to maintain a display state or a non-display state.

In one embodiment, the mixture of butadiene styrene copolymer and stearic acid can be made by dissolving a butadiene styrene copolymer and a stearic acid in a mixture solution of THF and toluene. The mixture of butadiene styrene copolymer and stearic acid can change from nontransparent state to transparent state at a temperature of about 57° C. The mixture of butadiene styrene copolymer and stearic acid can change from transparent state to nontransparent state at a temperature of above 70° C.

The second transparence-changeable material is a mixture of at least two polymers which is phase-changeable between compatible state and incompatible state. The working principle of the second transparence-changeable material is described as follows. The second transparence-changeable material has a critical compatible temperature above 40° C. When the temperature is below the critical compatible temperature, the second transparence-changeable material is colorless and transparent due to the compatibility between different polymer components. When the temperature is above the critical compatible temperature, the second transparence-changeable material is nontransparent due to the incompatibility between different polymer components. When the nontransparent second transparence-changeable material cools down to a certain temperature in a range from about 10° C. to about 40° C. rapidly from a temperature above the critical compatible temperature, the nontransparent state can remain at the certain temperature, without any outside energy. When the second transparence-changeable material, in a nontransparent state, is heated to a temperature below the critical compatible temperature and above 40° C., the nontransparent second transparence-changeable material becomes transparent. Because the transparent and the nontransparent state can remain at the certain temperature, without any outside energy, the color displayed by the thermochromatic device 220 can remain. Thus a bistable display can be achieved. In one embodiment, the second transparence-changeable material is a mixture of vinylidene fluoride hexafluoroacetone copolymer and low molecular weight poly methyl methacrylate with a mass ratio of about 1:3. The polymerization degree of the poly methyl methacrylate is about 60%.

The third transparence-changeable material is a polymer material which is phase-changeable between crystalline and amorphous. The working principle of the third transparence-changeable material is described as follows. Because the first light transmissivity of the crystalline third transparence-changeable material and the second light transmissivity of the amorphous third transparence-changeable material are different, the color element 218 can perform a transformation between transparent state and nontransparent state when a heat write pluses or a heat erase pulse is supplied. The heat write pluses allow the thermochromatic device 220 to display an color. The heat erase pluses can erase the color. In one embodiment, the third transparence-changeable material is a poly (1.4-thiophenol-1.4-divinylbenzene). The amorphous poly (1.4-thiophenol-1.4-divinylbenzene) is transparent with a light transmissivity of 91%. The crystalline poly (1.4-thiophenol-1.4-divinylbenzene) is nontransparent with a light transmissivity less than 1%. The color element 218 made of poly (1.4-thiophenol-1.4-divinylbenzene) with a thickness from about 0.1 micrometers to about 0.5 micrometers can change from nontransparent crystalline state to transparent amorphous state in a time from about 1 second to about 2 seconds at a heating temperature of about 170° C., and change from transparent amorphous state to nontransparent crystalline state in a time from about 20 minutes to about 30 minutes at a heating temperature from about 70° C. to about 80° C.

When the thermochromatic device 220 needs to display an color, a short and intensive heat write pulse can be supplied to heat the color element 218. Because the heating temperature of the heat write pulse is very high, the color element 218 is heated to a liquid state instantly. Because the heating time of the heat write pulse is very short, the temperature of the color element 218 decreases instantly and the liquid state color element 218 becomes a transparent amorphous solid state. Thus, the thermochromatic device 220 can show the color of the back color layer 226. The third transparence-changeable material of the color element 218 can remain in a transparent amorphous state, at a room temperature, without any outside energy. When the thermochromatic device 220 needs to erase the color, a long and weak heat erase pulse can be supplied to heat the color element 218. The process is an annealing process. After annealing, the third transparence-changeable material of the color element 218 is changed to the original nontransparent crystalline state from transparent amorphous state. Thus, the thermochromatic device 220 cannot show any color of the back color layer 226, and the color is erased. The third transparence-changeable material of the color element 218 can remain in a nontransparent crystalline state, at a room temperature, without any outside energy. Because of this, the color displayed by the thermochromatic device 220 can remain. Thus, a bistable display can be achieved.

In one embodiment, the color element 218 is a layer of poly(1.4-thiophenol-1.4-divinylbenzene) with a thickness from about 10 micrometers to about 400 micrometers. In other embodiments, the color element 218 is a layer of poly (1.4-thiophenol-1.4-divinylbenzene) with a thickness from about 50 micrometers to about 100 micrometers. The color element 218 can be formed by spraying, printing, sputtering or thermal deposition. The color element 218 is located between the first electrode 210 and the second electrode 212. The color element 218 can be spaced from the first electrode 210 and the second electrode 212 or make contact with the first electrode 210 and the second electrode 212.

The heating element 208 includes a carbon nanotube structure. The carbon nanotube structure includes a plurality of carbon nanotubes uniformly distributed therein, and the carbon nanotubes therein can be combined by van der Waals attractive force therebetween. The carbon nanotube structure can be a substantially pure structure of the carbon nanotubes, with few impurities. The carbon nanotubes can be used to form many different structures and provide a large specific surface area. The heat capacity per unit area of the carbon nanotube structure can be less than $2 \times 10^{-4}$ J/m$^2$·K. In one embodiment, the heat capacity per unit area of the carbon nanotube structure is less than $1.7 \times 10^{-6}$ J/m$^2$·K. As the heat capacity of the carbon nanotube structure is very low, and the temperature of the heating element 208 can rise and fall quickly, which makes the heating element 208 have a high heating efficiency and accuracy. As the carbon nanotube structure can be substantially pure, the carbon nanotubes are not easily oxidized and the life of the heating element 208 will be relatively long. Further, the carbon nanotubes have a low density, about 1.35 g/cm$^3$, so the heating element 208 is light. As the heat capacity of the carbon nanotube structure is very low, the heating element 208 has a high response heating speed. As the carbon nanotube has large specific surface area, the carbon nanotube structure with a plurality of carbon nanotubes has large specific surface area. When the specific surface of the carbon nanotube structure is large enough, the carbon nanotube structure is adhesive and can be directly applied to a surface.

The carbon nanotubes in the carbon nanotube structure can be arranged orderly or disorderly. The term 'disordered carbon nanotube structure' includes, but is not limited to, to a structure where the carbon nanotubes are arranged along many different directions, and the aligning directions of the carbon nanotubes are random. The number of the carbon nanotubes arranged along each different direction can be almost the same (e.g. uniformly disordered). The disordered carbon nanotube structure can be isotropic. The carbon nanotubes in the disordered carbon nanotube structure can be entangled with each other.

The carbon nanotube structure including ordered carbon nanotubes is an ordered carbon nanotube structure. The term 'ordered carbon nanotube structure' includes, but is not limited to, to a structure where the carbon nanotubes are arranged in a consistently systematic manner, e.g., the carbon nanotubes are arranged approximately along a same direction and/or have two or more sections within each of which the carbon nanotubes are arranged approximately along a same direction (different sections can have different directions). The carbon nanotubes in the carbon nanotube structure can be single-walled, double-walled, or multi-walled carbon nanotubes.

The carbon nanotube structure can be a carbon nanotube film structure with a thickness ranging from about 0.5 nanometers to about 1 millimeter. The carbon nanotube film structure can include at least one carbon nanotube film. The carbon nanotube structure can also be a linear carbon nanotube structure with a diameter ranging from about 0.5 nanometers to about 1 millimeter. The carbon nanotube structure can also be a combination of the carbon nanotube film structure and the linear carbon nanotube structure. It is understood that any carbon nanotube structure described can be used with all embodiments. It is also understood that any carbon nanotube structure may or may not employ the use of a support structure.

When the heating element 208 is a carbon nanotube film structure, the carbon nanotube film structure can be located on the surface of the insulating substrate 202 or the surface of the color element 218. When the heating element 208 is a linear carbon nanotube structure, the linear carbon nanotube structure can be located around the color element 218.

Figure 2:
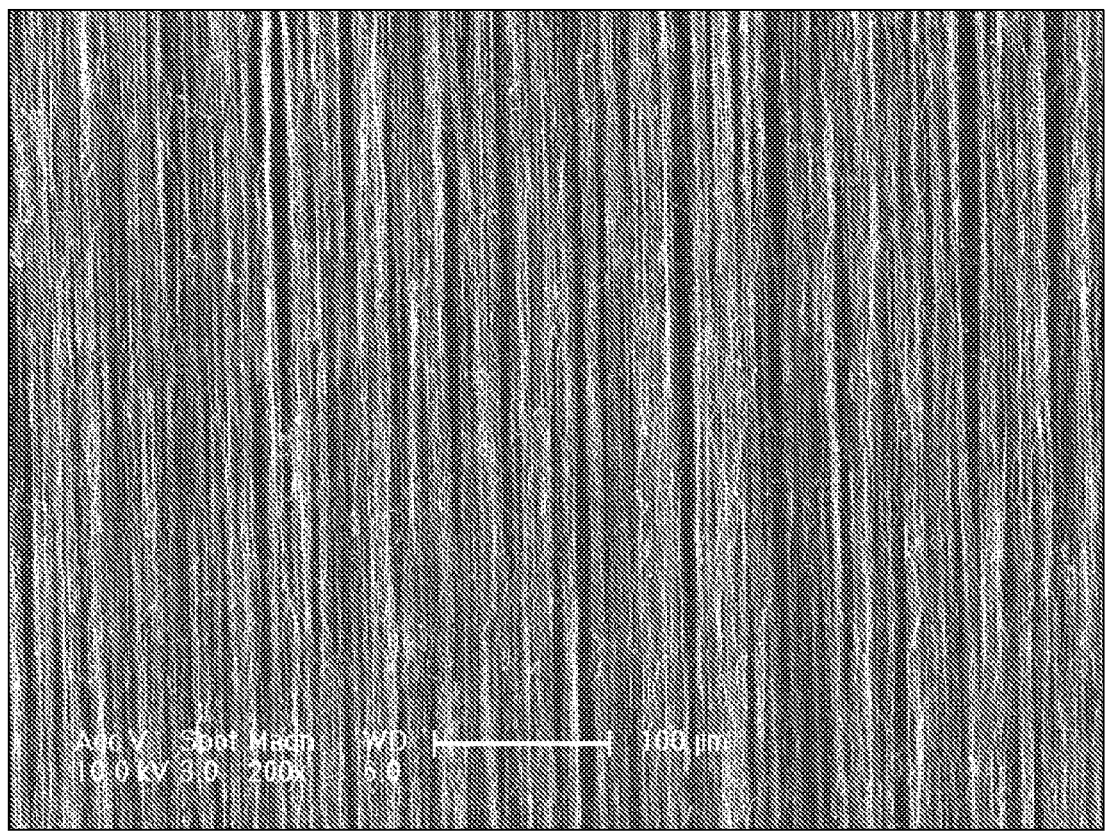
FIG. 2 is a Scanning Electron Microscope (SEM) image of a drawn carbon nanotube film.
Figure 3:
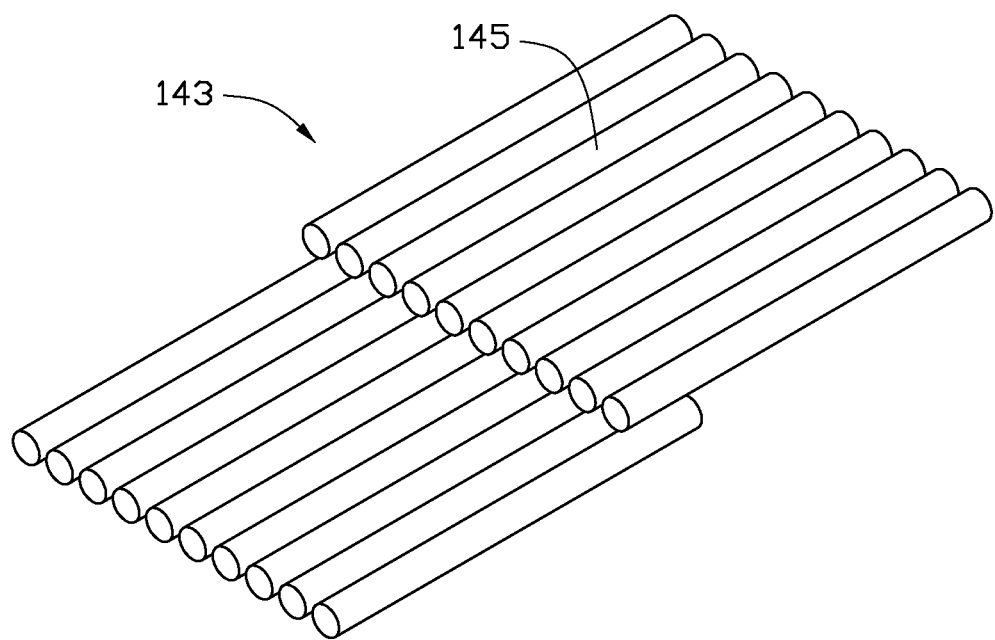
FIG. 3 is a schematic of a carbon nanotube segment.

In one embodiment, the carbon nanotube film structure includes at least one drawn carbon nanotube film. A drawn carbon nanotube film can be drawn from a carbon nanotube array that is able to have a film drawn therefrom. The drawn carbon nanotube film includes a plurality of successive and oriented carbon nanotubes joined end-to-end by van der Waals attractive force therebetween. The drawn carbon nanotube film is a free-standing film. Referring to FIGS. 2 to 3, each drawn carbon nanotube film includes a plurality of successively oriented carbon nanotube segments 143 joined end-to-end by van der Waals attractive force therebetween. Each carbon nanotube segment 143 includes a plurality of carbon nanotubes 145 parallel to each other, and combined by van der Waals attractive force therebetween. As can be seen in FIG. 2, some variations can occur in the drawn carbon nanotube film. The carbon nanotubes 145 in the drawn carbon nanotube film are oriented along a preferred orientation. The carbon nanotube film can be treated with an organic solvent to increase the mechanical strength and toughness and reduce the coefficient of friction of the carbon nanotube film. A thickness of the carbon nanotube film can range from about 0.5 nanometers to about 100 micrometers. In one embodiment, the heating element 208 is a single drawn carbon nanotube film with a length of 300 micrometers and a width of 100 micrometers. The carbon nanotubes of the heating element 208 extend from the first electrode 210 to the second electrode 212. The drawn carbon nanotube film can be attached to surfaces of the insulating substrate 202 with an adhesive, by mechanical force, by the adhesive properties of the carbon nanotube film, or by a combination thereof. The response speed of the drawn carbon nanotube film is very high because of the very low heat capacity per unit area, the large surface area, and the large radiation coefficient. The temperature of the single drawn carbon nanotube film with a length of 300 micrometers and a width of 100 micrometers can be risen to 2000 Kelvin in 1 millisecond.

The carbon nanotube film structure of the heating element 208 can include at least two stacked drawn carbon nanotube films. In other embodiments, the carbon nanotube structure can include two or more coplanar carbon nanotube films, and can include layers of coplanar carbon nanotube films. Additionally, when the carbon nanotubes in the carbon nanotube film are aligned along one preferred orientation (e.g., the drawn carbon nanotube film), an angle can exist between the orientation of carbon nanotubes in adjacent films, whether stacked or adjacent. Adjacent carbon nanotube films can be combined by only the van der Waals attractive force therebetween. The number of the layers of the carbon nanotube films is not limited as long as the carbon nanotube structure. However the thicker the carbon nanotube structure, the specific surface area will decrease. An angle between the aligned directions of the carbon nanotubes in two adjacent carbon nanotube films can range from about 0 degrees to about 90 degrees. When the angle between the aligned directions of the carbon nanotubes in adjacent stacked carbon nanotube films is larger than 0 degrees, a microporous structure is defined by the carbon nanotubes in the heating element 208. The carbon nanotube structure in an embodiment employing these films will have a plurality of micropores. Stacking the carbon nanotube films will also add to the structural integrity of the carbon nanotube structure. In some embodiments, the carbon nanotube structure is a free standing structure.

In another embodiment, the carbon nanotube film structure includes a flocculated carbon nanotube film. The flocculated carbon nanotube film can include a plurality of long, curved, disordered carbon nanotubes entangled with each other. Further, the flocculated carbon nanotube film can be isotropic. The carbon nanotubes can be substantially uniformly dispersed in the carbon nanotube film. Adjacent carbon nanotubes are acted upon by van der Waals attractive force to form an entangled structure with micropores defined therein. It is understood that the flocculated carbon nanotube film is very porous. Sizes of the micropores can be less than 10 micrometers. The porous nature of the flocculated carbon nanotube film will increase specific surface area of the carbon nanotube structure. Further, due to the carbon nanotubes in the carbon nanotube structure being entangled with each other, the carbon nanotube structure employing the flocculated carbon nanotube film has excellent durability, and can be fashioned into desired shapes with a low risk to the integrity of the carbon nanotube structure. The flocculated carbon nanotube film, in some embodiments, is free standing due to the carbon nanotubes being entangled and adhered together by van der Waals attractive force therebetween. The thickness of the flocculated carbon nanotube film can range from about 0.5 nanometers to about 1 millimeter.

In another embodiment, the carbon nanotube film structure can include at least a pressed carbon nanotube film. The pressed carbon nanotube film can be a free-standing carbon nanotube film. The carbon nanotubes in the pressed carbon nanotube film are arranged along a same direction or arranged along different directions. The carbon nanotubes in the pressed carbon nanotube film can rest upon each other. Adjacent carbon nanotubes are attracted to each other and combined by van der Waals attractive force. An angle between a primary alignment direction of the carbon nanotubes and a surface of the pressed carbon nanotube film is 0 degrees to approximately 15 degrees. The greater the pressure applied, the smaller the angle formed. When the carbon nanotubes in the pressed carbon nanotube film are arranged along different directions, the carbon nanotube structure can be isotropic. The thickness of the pressed carbon nanotube film ranges from about 0.5 nanometers to about 1 millimeter.

Carbon nanotube structures include linear carbon nanotubes. In other embodiments, the linear carbon nanotube structures, including carbon nanotube wires and/or carbon nanotube cables, can be used.

Figure 4:
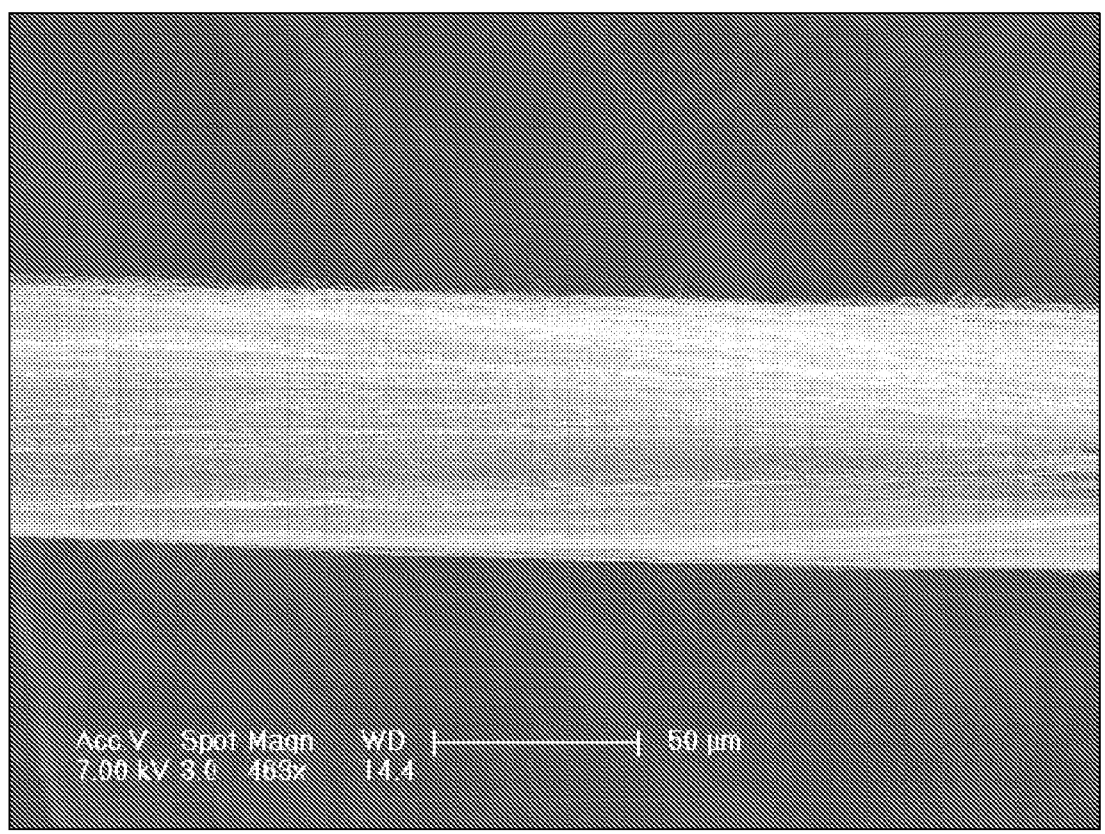
FIG. 4 is an SEM image of an untwisted carbon nanotube wire.

The carbon nanotube wire can be untwisted or twisted. Treating the drawn carbon nanotube film with a volatile organic solvent can form the untwisted carbon nanotube wire. Specifically, the organic solvent is applied to soak the entire surface of the drawn carbon nanotube film. During the soaking, adjacent parallel carbon nanotubes in the drawn carbon nanotube film will bundle together, due to the surface tension of the organic solvent as it volatilizes, and thus, the drawn carbon nanotube film will be shrunk into untwisted carbon nanotube wire. Referring to FIG. 4, the untwisted carbon nanotube wire includes a plurality of carbon nanotubes substantially oriented along a same direction (i.e., a direction along the length of the untwisted carbon nanotube wire). The carbon nanotubes are parallel to the axis of the untwisted carbon nanotube wire. More specifically, the untwisted carbon nanotube wire includes a plurality of successive carbon nanotube segments joined end to end by van der Waals attractive force therebetween. Each carbon nanotube segment includes a plurality of carbon nanotubes substantially parallel to each other, and combined by van der Waals attractive force therebetween. The carbon nanotube segments can vary in width, thickness, uniformity and shape. Length of the untwisted carbon nanotube wire can be arbitrarily set as desired. A diameter of the untwisted carbon nanotube wire ranges from about 0.5 nanometers to about 100 micrometers.

Figure 5:
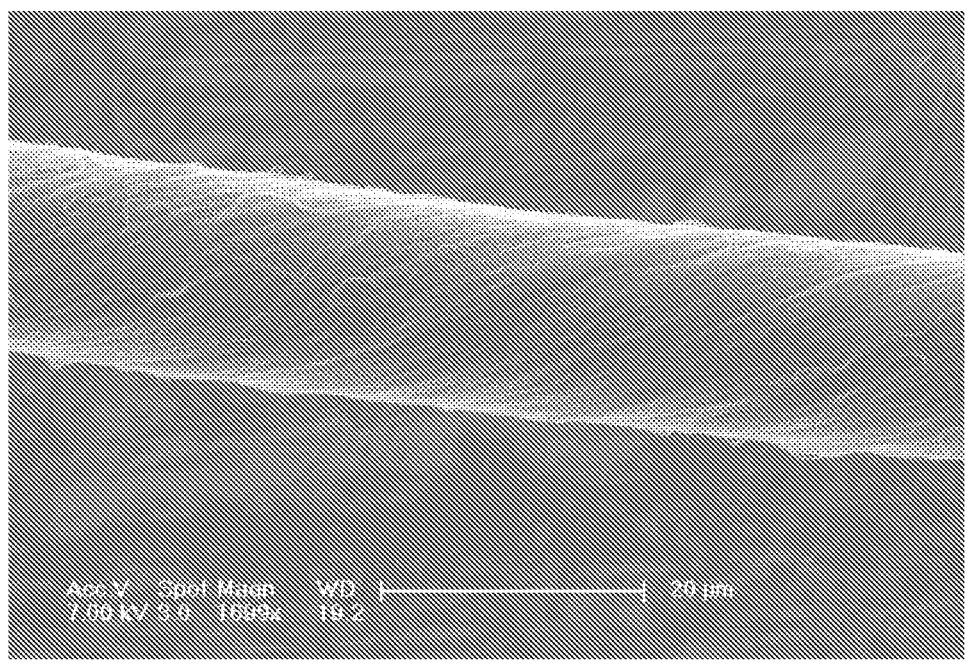
FIG. 5 is an SEM image of a twisted carbon nanotube wire.

The twisted carbon nanotube wire can be formed by twisting a drawn carbon nanotube film using a mechanical force to turn the two ends of the drawn carbon nanotube film in opposite directions. Referring to FIG. 5, the twisted carbon nanotube wire includes a plurality of carbon nanotubes helically oriented around an axial direction of the twisted carbon nanotube wire. More specifically, the twisted carbon nanotube wire includes a plurality of successive carbon nanotube segments joined end to end by van der Waals attractive force therebetween. Each carbon nanotube segment includes a plurality of carbon nanotubes parallel to each other, and combined by van der Waals attractive force therebetween. Length of the carbon nanotube wire can be set as desired. A diameter of the twisted carbon nanotube wire can be from about 0.5 nanometers to about 100 micrometers. Further, the twisted carbon nanotube wire can be treated with a volatile organic solvent after being twisted. After being soaked by the organic solvent, the adjacent paralleled carbon nanotubes in the twisted carbon nanotube wire will bundle together, due to the surface tension of the organic solvent when the organic solvent volatilizing. The specific surface area of the twisted carbon nanotube wire will decrease, while the density and strength of the twisted carbon nanotube wire will be increased.

The carbon nanotube cable includes two or more carbon nanotube wires. The carbon nanotube wires in the carbon nanotube cable can be, twisted or untwisted. In an untwisted carbon nanotube cable, the carbon nanotube wires are parallel with each other. In a twisted carbon nanotube cable, the carbon nanotube wires are twisted with each other.

The heating element 208 can include one or more linear carbon nanotube structures. The plurality of linear carbon nanotube structures can be paralleled with each other, cross with each other, weaved together, or twisted with each other. The resulting structure can be a planar structure if so desired.

In other embodiments, the carbon nanotube structure can be a carbon nanotube layer formed by printing. The carbon nanotube layer includes a plurality of carbon nanotubes disorderly distributed therein.

In other embodiments, the carbon nanotube structure can include other materials thus becoming carbon nanotube composite. The carbon nanotube composite can include a carbon nanotube structure and a plurality of fillers dispersed therein. The filler can be comprised of metal, ceramic, glass, carbon fiber or combinations thereof. Alternatively, the carbon nanotube composite can include a matrix and a plurality of carbon nanotubes dispersed therein. The matrix can be comprised of resin, metal, ceramic, glass, carbon fiber or combinations thereof. In one embodiment, a carbon nanotube structure is packaged in a resin matrix.

The first electrode 210 and the second electrode 212 can be located on the surface of the insulating substrate 202, on the surface of the color element 218, or on the surface of the heating element 208. The first electrode 210 and the second electrode 212 can be made of conductive material such as carbon nanotube, metal, alloy, indium tin oxides (ITO), antimony doped Tin oxide (ATO), conductive polymer, or a conductive slurry. In one embodiment, the first electrode 210 and the second electrode 212 are formed on the surface of the heating element 208 by a printing process. The conductive slurry is composed of metal powder, glass powder, and binder. The metal powder can be silver powder, the glass powder has low melting point, and the binder can be terpineol or ethyl cellulose (EC). The conductive slurry can include from about 50% to about 90% (by weight) of the metal powder, from about 2% to about 10% (by weight) of the glass powder, and from about 8% to about 40% (by weight) of the binder.

Thermochromatic device 220 can be made by the following steps:
(a) forming a back color layer 226 on a surface 2020 of the insulating substrate 202;
(b) laying a heating element 208, comprising a drawn carbon nanotube film, on a surface of the back color layer 226;
(c) applying a first electrode 210 and a second electrode 212 on a surface of the heating element 208; and
(d) coating a layer of poly (1.4-thiophenol-1.4-divinylbenzene) between the first electrode 210 and the second electrode 212 as a color element 218.

The color element 218, that is made of the poly (1.4-thiophenol-1.4-divinylbenzene), is used to illustrate the working process of the thermochromatic device 220. During operation, a pulse voltage is supplied to the first electrode 210 and the second electrode 212. The temperature of the heating element 208 raises and a heat pulse is supplied to the color element 218 from the heating element 208. When the pulse voltage is short and high, a short and intensive heat write pulse can be supplied by the heating element 208. When the pulse voltage is long and low, a long and weak heat erase pulse can be supplied by the heating element 208. When the thermochromatic device 220 needs to display an color, a short and intensive heat write pulse can be supplied to the color element 218. For example, the temperature of the heat write pulse is about 170° C. and the cycle of the heat write pulse is in a range from about 1 second to about 2 seconds. Because the heating temperature of the heat write pulse is very high, the color element 218 is heated to a liquid state instantly. Because the heating time of the heat write pulse is very short, the temperature of the color element 218 decreases instantly and the liquid state color element 218 becomes a transparent amorphous solid state. Thus, the thermochromatic device 220 can show the color of the back color layer 226. The third transparence-changeable material of the color element 218 can remain in a transparent amorphous state, at a room temperature, without any outside energy. When the thermochromatic device 220 needs to erase the color, a long and weak heat erase pulse can be supplied to heat the color element 218. For example, the temperature of the heat write pulse is in a range from about 70° C. to about 80° C. and the cycle of the heat write pulse is in a range from about 20 seconds to about 30 seconds. The process is an annealing process. After annealing, the third transparence-changeable material of the color element 218 is changed to the original nontransparent crystalline state from transparent amorphous state. Thus, the thermochromatic device 220 cannot show any color. The color element 218 can remain in a nontransparent crystalline state, at a room temperature, without any outside energy. Because of this, the color displayed by the thermochromatic device 220 can remain. Thus, a bistable display can be achieved. The bistable display means that the energy is only consumed during the process of writing and erasing, and there is no energy consumption after the process of writing and erasing. Thus, the thermochromatic device 220 can save energy.

Figure 6:
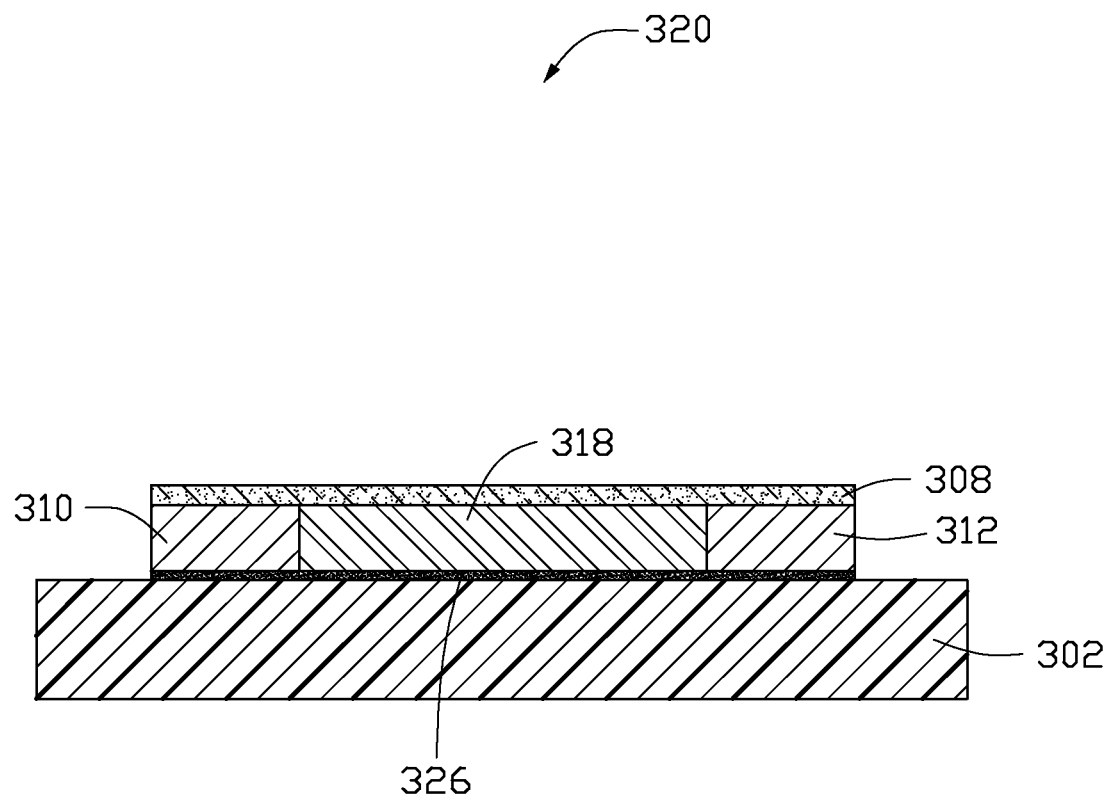
FIG. 6 is a schematic view of one embodiment of a thermochromatic device.

Referring to FIG. 6, a thermochromatic device 320 of one embodiment includes an insulating substrate 302, a back color layer 326, a color element 318, a heating element 308, a first electrode 310, and a second electrode 312. The thermochromatic device 320 is similar to the thermochromatic device 220 described above except that the color element 318 is located between the back color layer 326 and the heating element 308. In one embodiment, both the heating element 308 and the color element 318 are layered structures. The back color layer 326 is located on a surface of the insulating substrate 302. The first electrode 310 and the second electrode 312 are located on a surface of the back color layer 326 and spaced from each other. The color element 318 is located on the surface of the back color layer 326, between the first electrode 310 and the second electrode 312. The heating element 308 is located on a surface of the color element 318 and covers the color element 318, the first electrode 310, and the second electrode 312. The heating element 308 is a single drawn carbon nanotube film, which is transparent.

Thermochromatic device 320 can be made by the following steps:
(e) forming a back color layer 326 on a surface of the insulating substrate 302;
(f) applying a first electrode 310 and a second electrode 312 on a surface of the back color layer 326;
(g) depositing a layer of poly(1.4-thiophenol-1.4-divinylbenzene) between the first electrode 310 and the second electrode 312 as a color element 318; and
(h) placing a single drawn carbon nanotube film on a surface of the color element 318 to cover the color element 318, the first electrode 310 and the second electrode 312.

Figure 7:
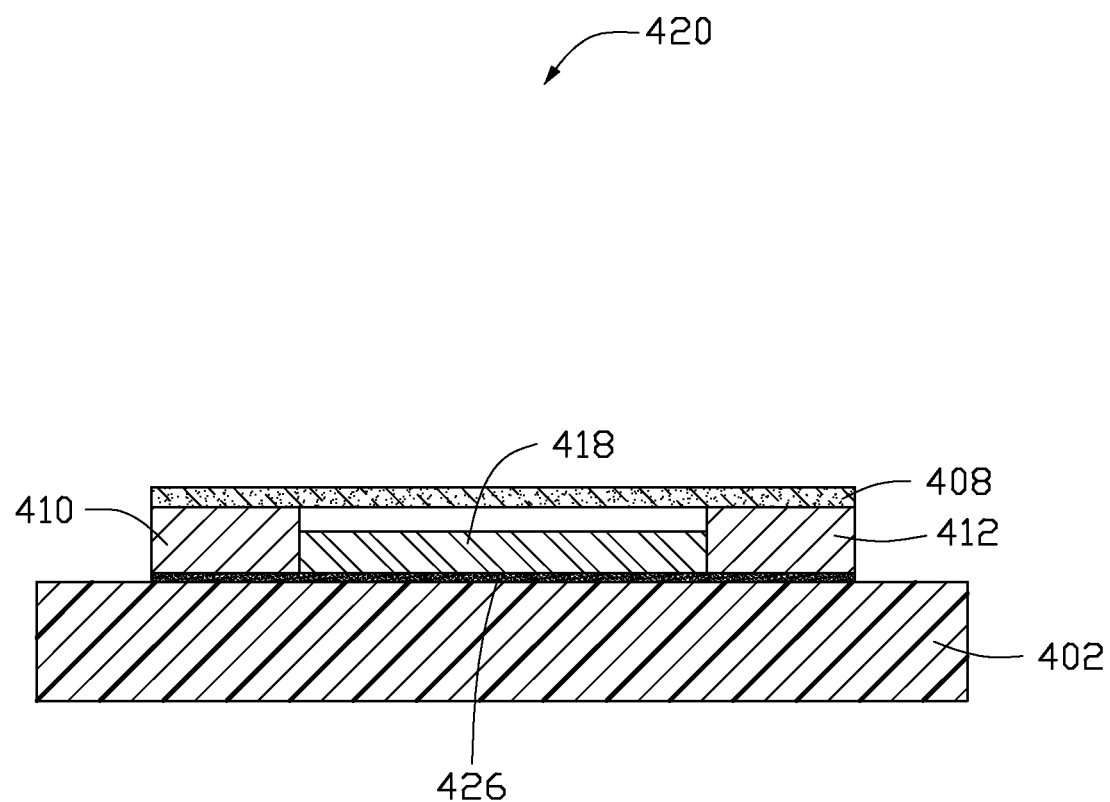
FIG. 7 is a schematic view of one embodiment of a thermochromatic device.

Referring to FIG. 7, a thermochromatic device 420 of one embodiment includes an insulating substrate 402, a back color layer 426, a color element 418, a heating element 408, a first electrode 410, and a second electrode 412. The thermochromatic device 420 is similar to the thermochromatic device 320 described above except that the heating element 408 is spaced from the color element 418. In one embodiment, both the heating element 408 and the color element 418 are layered structures. The back color layer 426 is located on a surface of the insulating substrate 402. The first electrode 410 and the second electrode 412 are located on a surface of the back color layer 426 and spaced from each other. The color element 418 is located on a surface of the back color layer 426 and between the first electrode 410 and the second electrode 412. The thickness of the color element 418 is thinner than the thickness of the electrodes 410 and 412. The heating element 408 is located on a surface of the first electrode 410 and the second electrode 412 and spaced from the color element 418. The heating element 408 is a single drawn carbon nanotube film, which is a transparent and free standing. The heat capacity per unit area of the single drawn carbon nanotube film is less than $1.7 \times 10^{-6}$ J/m$^2 \cdot$K. The main heat exchange manner between the color element 418 and the heating element 408 is heat radiation. Because the single drawn carbon nanotube film has small heat capacity per unit area, the heating element 408 can be heated to a high temperature in short time and supply a short and intensive heat write pulse to the color element 418. Therefore, the thermochromatic device 420 has an improved response speed.

Figure 8:
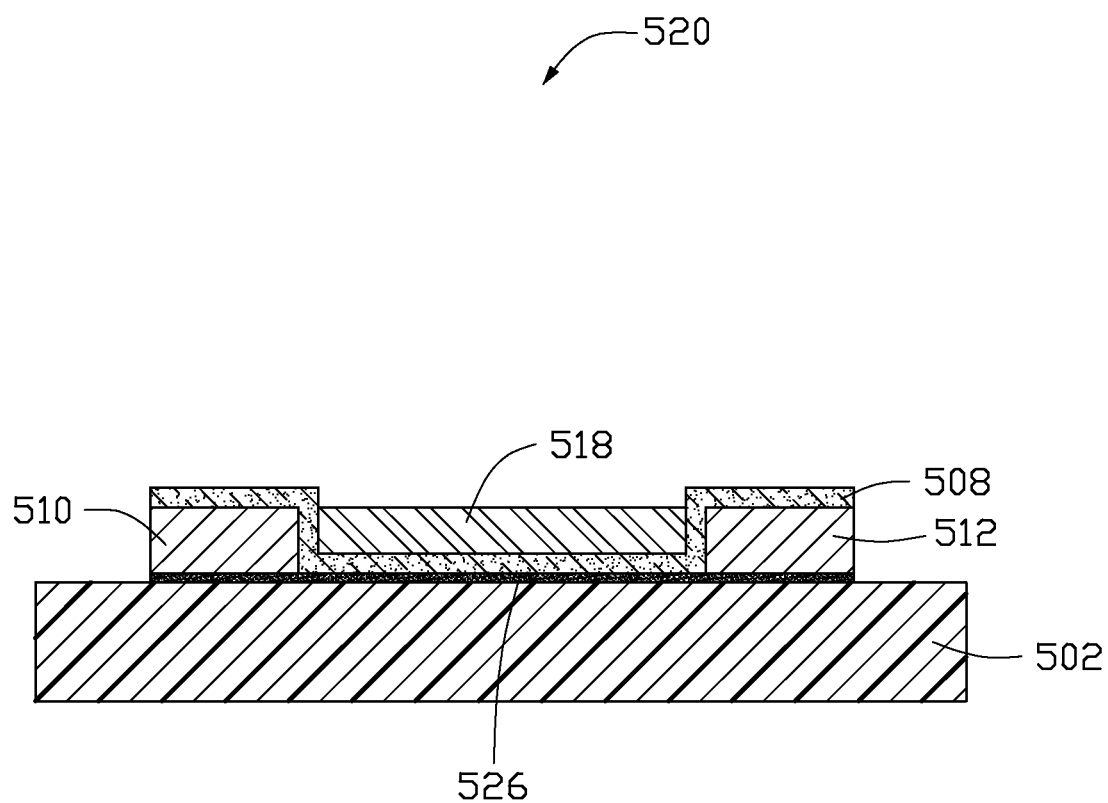
FIG. 8 is a schematic view of one embodiment of a thermochromatic device.

Referring to FIG. 8, a thermochromatic device 520 of one embodiment includes an insulating substrate 502, a back color layer 526, a color element 518, a heating element 508, a first electrode 510, and a second electrode 512. The thermochromatic device 520 is similar to the thermochromatic device 220 described above except that the heating element 508 is located between the back color layer 526 and the color element 518 and extends to side surfaces of the color element 518. In one embodiment, the back color layer 526 is located on a surface of the insulating substrate 502. The first electrode 510 and the second electrode 512 are located on a surface of the back color layer 526 and spaced from each other. The color element 518 is located between the first electrode 510 and the second electrode 512. The heating element 508, located between the back color layer 526 and the color element 518, extends to a top surface of the electrodes 510 and 512 through side surfaces of the electrodes 510 and 512. The heating element 508 can also extend to a top surface of the color element 518 to package the color element 518. The heating element 508 is a single drawn carbon nanotube film, which is transparent and free standing. Because the heating element 508 and the color element 518 have a great contacting surface, the color element 518 can be heated effectively. Therefore, the thermochromatic device 520 has an improved response speed.

Thermochromatic device 520 can be made by the following steps:
(i) forming a back color layer 526 on a surface of the insulating substrate 502;
(g) applying a first electrode 510 and a second electrode 512 on a surface of the back color layer 526;
(k) laying a single drawn carbon nanotube film on a surface of the electrodes 510 and 512 to cover the first electrode 510 and the second electrode 512;
(l) pressing the carbon nanotube film between the first electrode 510 and the second electrode 512 so that the carbon nanotube film attaches on the surface of the insulating substrate 502 and two opposite surfaces of the electrodes 510 and 512; and
(m) depositing a layer of poly(1.4-thiophenol-1.4-divinylbenzene) between the first electrode 510 and the second electrode 512 as a color element 518.

Figure 9:
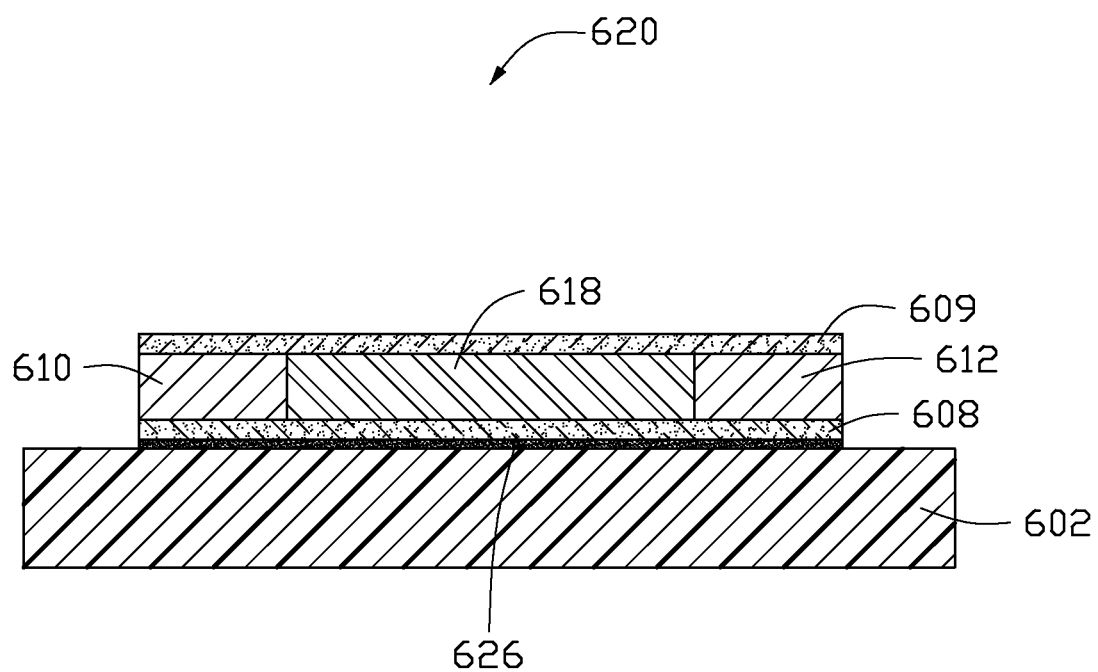
FIG. 9 is a schematic view of one embodiment of a thermochromatic device.

Referring to FIG. 9, a thermochromatic device 620 of one embodiment includes an insulating substrate 602, a back color layer 626, a color element 618, a first heating element 608, a second heating element 609, a first electrode 610 and a second electrode 612. The thermochromatic device 620 is similar to the thermochromatic device 220 described above except that the thermochromatic device 620 includes two heating elements 608, 609. In one embodiment, the back color layer 626 is located on a surface of the insulating substrate 602. The first heating element 608 is located on a surface of the back color layer 626. The first electrode 610 and the second electrode 612 are located on a surface of the first heating element 608 and spaced from each other. The color element 618 is located on the surface of the first heating element 608 and between the first electrode 610 and the second electrode 612. The second heating element 609 is located on a surface of the color element 618 and covers the first electrode 610 and the second electrode 612. The heating elements 608, 609 are single drawn carbon nanotube film, which is transparent and free standing. Because the thermochromatic device 620 has two heating elements 608, 609, the color element 618 can be heated effectively. Therefore, the thermochromatic device 620 has an improved response speed.

Thermochromatic device 620 can be made by the following steps:
(n) forming a back color layer 626 on a surface of the insulating substrate 602;
(o) laying a first drawn carbon nanotube film on a surface of the back color layer 626 as a first heating elements 608;
(p) applying a first electrode 610 and a second electrode 612 on a surface of the first heating elements 608;
(q) depositing a layer of poly(1.4-thiophenol-1.4-divinylbenzene) between the first electrode 610 and the second electrode 612 as a color element 618; and
(r) laying a second drawn carbon nanotube film on a surface of the color element 618 to cover the first electrode 610 and the second electrode 612.

Figure 10:
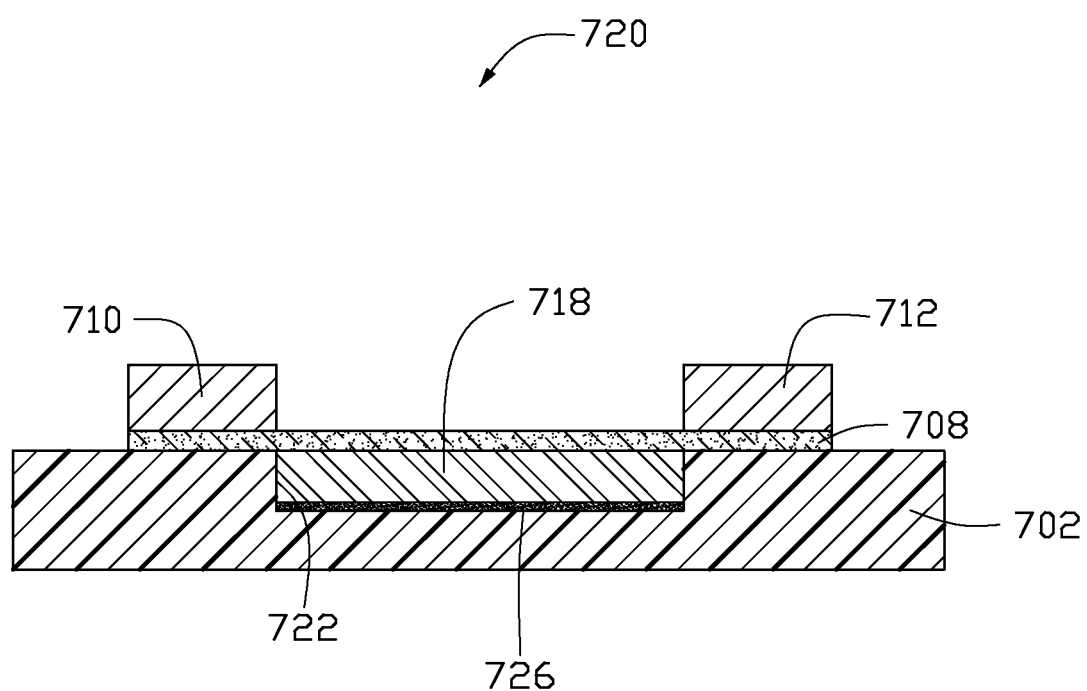
FIG. 10 is a schematic view of one embodiment of a thermochromatic device.

Referring to FIG. 10, a thermochromatic device 720 of one embodiment includes an insulating substrate 702, a back color layer 726, a color element 718, a heating element 708, a first electrode 710, and a second electrode 712. The thermochromatic device 720 is similar to the thermochromatic device 220 described above except that a recess 722 is defined at a surface of the insulating substrate 702, and the back color layer 726 and the color element 718 are located in the recess 722. In one embodiment, the back color layer 726 is located in the recess 722, and the color element 718 is located on a surface of back color layer 726. The total thickness of the color element 718 and back color layer 726 is the same as the depth of recess 722. The heating element 708 is located on a surface of the insulating substrate 702 and covers the recess 722. The first electrode 710 and the second electrode 712 are located on a surface of the heating element 708 and spaced from each other. The heating element 708 is a single drawn carbon nanotube film which is a transparent and free standing film. The color element 718 can remain in a shape substantially the same as the shape of the recess 722 during heating process.

Thermochromatic device 720 can be made by the following steps:
(s) forming a recess 722 at a surface of the insulating substrate 702;
(t) forming a back color layer 726 in the recess 722;
(u) depositing a layer of poly (1.4-thiophenol-1.4-divinylbenzene) on the back color layer 726 as a color element 718;
(v) laying a single drawn carbon nanotube film on a surface of the insulating substrate 702 as the heating element 708, wherein the heating element 708 covers the recess 722; and
(w) applying a first electrode 710 and a second electrode 712 on a surface of the heating elements 708.

Figure 11:
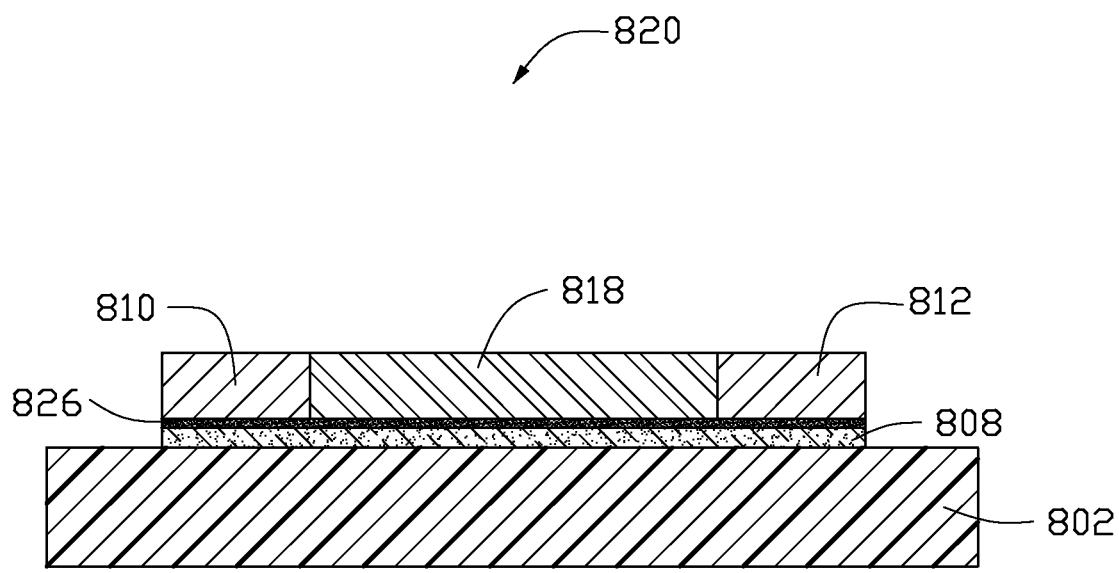
FIG. 11 is a schematic view of one embodiment of a thermochromatic device.

Referring to FIG. 11, a thermochromatic device 820 of one embodiment includes an insulating substrate 802, a back color layer 826, a color element 818, a heating element 808, a first electrode 810, and a second electrode 812. The thermochromatic device 820 is similar to the thermochromatic device 220 described above except that the back color layer 826 is located between the heating element 808 and the color element 818. In one embodiment, the heating element 808 is located on a surface of the insulating substrate 802. The back color layer 826 is located on a surface of the heating element 808. The first electrode 810 and the second electrode 812 are located on the back color layer 826 and spaced from each other. The color element 818 is located on a surface of the back color layer 826, between the first electrode 810 and the second electrode 812.

The disclosure further provides a thermochromatic display apparatus using the thermochromatic device described in above embodiments. The thermochromatic display apparatus includes a plurality of thermochromatic devices arranged to form a pixel matrix, a driving circuit capable of controlling the plurality of thermochromatic devices and a number of lead wires configured to electrically connect the driving circuit and the number of thermochromatic devices. The number of thermochromatic devices can use one common insulating substrate and be controlled by an addressing circuit. The thermochromatic display apparatus using the thermochromatic device 220 of the first embodiment is given below to illuminate the thermochromatic display apparatus of the disclosure.

Figure 12:
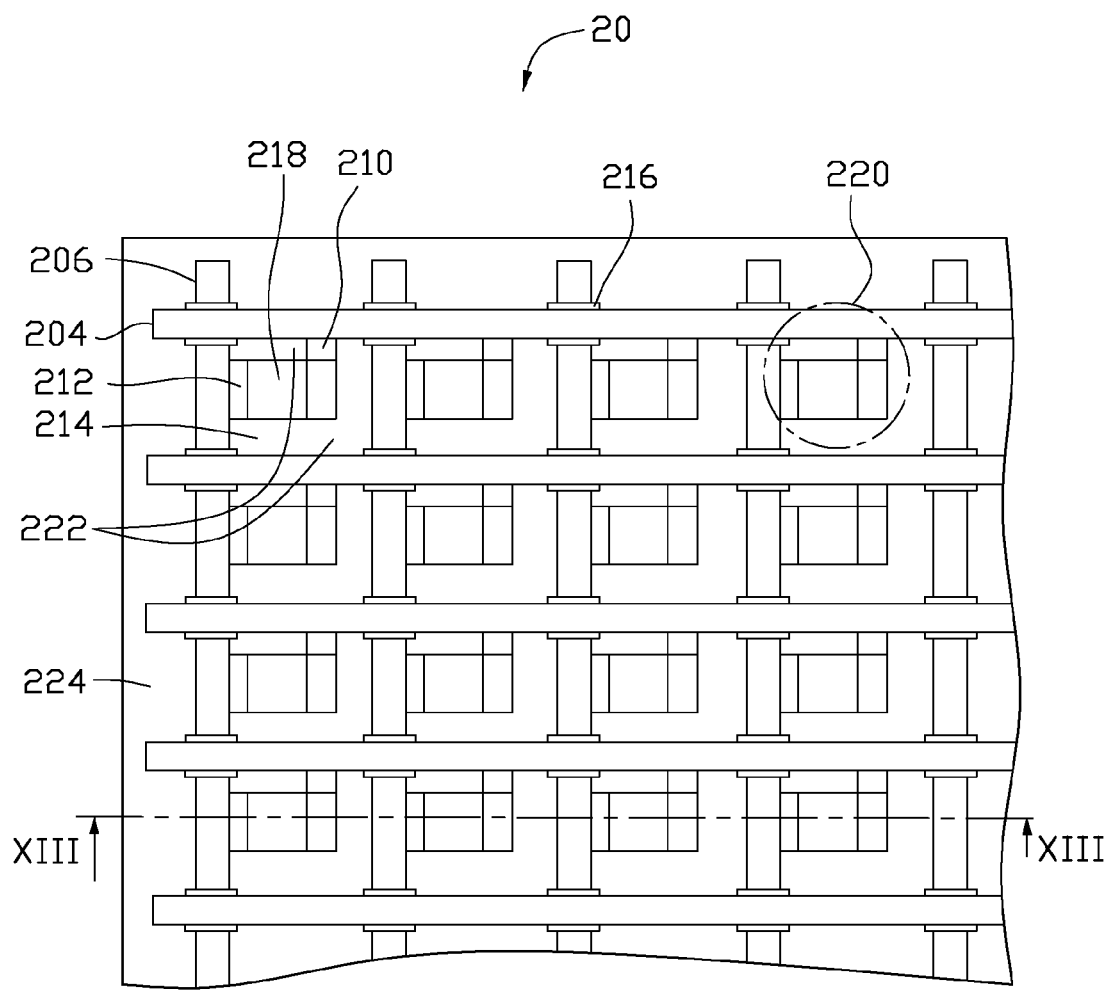
FIG. 12 is a schematic view of a thermochromatic display apparatus using the thermochromatic device of FIG. 1.
Figure 13:
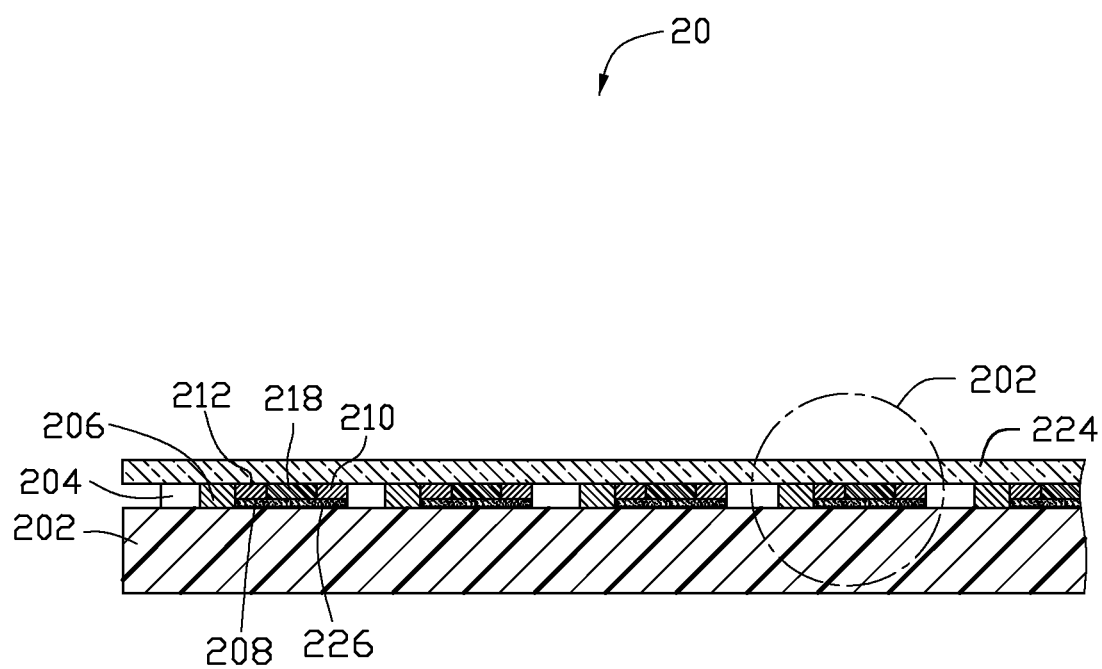
FIG. 13 is a schematic, cross-sectional view, along a line XIII-XIII of FIG. 12.

Referring to FIGS. 12 and 13, a thermochromatic display apparatus 20 includes an insulating substrate 202, a number of substantially parallel first electrode down-leads 204, a number of substantially parallel second electrode down-leads 206, and a number of thermochromatic devices 220. The number of first and second electrode down-leads 204, 206 are located on the insulating substrate 202. The first electrode down-leads 204 are generally set at an angle to the second electrode down-leads 206 to form a grid. A cell 214 is defined by each two substantially adjacent first electrode down-leads 204 and each two substantially adjacent second electrode down-leads 206 of the grid. One of the thermochromatic devices 220 is located in each cell 214. Each thermochromatic device 220 corresponds to a pixel of the thermochromatic display apparatus 20.

The insulating substrate 202 is configured for supporting the first electrode down-leads 204, the second electrode down-leads 206, and the thermochromatic devices 220. The shape, size, and thickness of the insulating substrate 202 can be chosen according to need. In one embodiment, the insulating substrate 202 is a square PET substrate with a thickness of 1 millimeter and an edge length of 48 millimeters. The number of thermochromatic devices 220 uses a common insulating substrate 202.

The first electrode down-leads 204 are located equidistantly apart. A distance between adjacent two first electrode down-leads 204 can range from about 50 micrometers to about 2 centimeters. The second electrode down-leads 206 are located equidistantly apart. A distance between adjacent two second electrode down-leads 206 can range from about 50 micrometers to about 2 centimeters. A suitable orientation of the first electrode down-leads 204 and the second electrode down-leads 206 are that they be set at an angle with respect to each other. The angle can range from about 10 degrees to about 90 degrees. In one embodiment, the angle is 90 degrees, and the cell 214 is a square area.

The first electrode down-leads 204 and the second electrode down-leads 206 are made of conductive material such as metal or conductive slurry. In one embodiment, the first electrode down-leads 204 and the second electrode down-leads 206 are formed by applying conductive slurry on the insulating substrate 202 using screen printing process. The conductive slurry composed of metal powder, glass powder, and binder. The metal powder can be silver powder, the glass powder having low melting point, and the binder can be terpineol or ethyl cellulose (EC). The conductive slurry can include about 50% to about 90% (by weight) of the metal powder, about 2% to about 10% (by weight) of the glass powder, and about 8% to about 40% (by weight) of the binder.

In one embodiment, each of the first electrode down-leads 204 and the second electrode down-leads 206 is formed with a width in a range from about 30 micrometers to about 100 micrometers and with a thickness in a range from about 10 micrometers to about 50 micrometers. However, it is noted that dimensions of each of the first electrode down-leads 204 and the second electrode down-leads 206 can vary corresponding to dimension of each cell 214.

The first electrodes 210 of the thermochromatic devices 220 arranged in a row of the cells 214 can be electrically connected to the first electrode down-lead 204. The second electrodes 212 of the thermochromatic devices 220 arranged in a column of the cells 214 can be electrically connected to the second electrode down-lead 206.

Each of the first electrodes 210 can have a length in a range from about 20 micrometers to about 15 millimeters, a width in a range from about 30 micrometers to 10 millimeters and a thickness in a range from about 10 micrometers to about 500 micrometers. Each of the second electrodes 212 has a length in a range from about 20 micrometers to about 15 millimeters, a width in a range from about 30 micrometers to about 10 millimeters and a thickness in a range from about 10 micrometers to about 500 micrometers. In one embodiment, the first electrode 210 has a length in a range from about 100 micrometers to about 700 micrometers, a width in a range from about 50 micrometers to about 500 micrometers and a thickness in a range from about 20 micrometers to about 100 micrometers. The second electrode 212 has a length in a range from about 100 micrometers to about 700 micrometers, a width in a range from about 50 micrometers to about 500 micrometers and a thickness in a range from about 20 micrometers to about 100 micrometers.

The first electrodes 210 and the second electrode 212 can be made of metal or conductive slurry. In one embodiment, the first electrode 210 and the second electrode 212 are formed by screen printing the conductive slurry on the insulating substrate 202. As mentioned above, the conductive slurry forming the first electrode 210 and the second electrode 212 is the same as the electrode down-leads 204, 206.

Furthermore, the thermochromatic display apparatus 20 can include a plurality of insulators 216 sandwiched between the first electrode down-leads 204 and the second electrode down-leads 206 to avoid short-circuiting. The insulators 216 are located at every intersection of the first electrode down-leads 204 and the second electrode down-leads 206 for providing electrical insulation therebetween. In one embodiment, the insulator 216 is a dielectric insulator.

In one embodiment, 16×16 (16 rows, and 16 thermochromatic devices 220 on each row) thermochromatic devices 220 are arranged on a square PET insulating substrate 202 with an edge length of 48 millimeters. Each heating element 208 is a single drawn carbon nanotube film with a length of 300 micrometers and a width of 100 micrometers. The single drawn carbon nanotube film is fixed on the surface of the insulating substrate 202 with an adhesive. The ends of the heating element 208 are located between the insulating substrate 202 and the electrodes 210 and 212. The carbon nanotubes of the heating element 208 extend from the first electrode 210 to the second electrode 212.

Furthermore, the thermochromatic display apparatus 20 can include a heat-resistant material 222 located around each thermochromatic device 220. The heat-resistant material 222 can be located in a space between the thermochromatic device 220 and the electrode down-leads 204, 206 in the cell 214. The thermochromatic devices 220 in adjacent cells 214 are heat insulated and will not interfere with each other. The heat-resistant material 222 can be aluminum oxide ($Al_2O_3$) or organic material such as PET, PC, PE, or PI. In one embodiment, the heat-resistant material 222 is PET with a thickness same as the thickness of the electrode down-leads 204, 206. The heat-resistant material 222 can be formed by printing, chemical vapor deposition (CVD) or physical vapor deposition (PVD).

Furthermore, the thermochromatic display apparatus 20 can include a protecting layer 224 located on the insulating substrate 202 to cover all the electrode down-leads 204, 206, and the thermochromatic devices 220. The protecting layer 224 is an insulating transparent layer that is made of aluminum oxide ($Al_2O_3$), silicon dioxide ($SiO_2$), or organic material such as PET, PC, PE, or PI. The thickness of the protecting layer 224 can be selected according to need. In one embodiment, the protecting layer 224 is a PET sheet with a thickness in a range from about 0.5 millimeter to about 2 millimeters. The protecting layer 224 can prevent the thermochromatic display apparatus 20 from being damaged and polluted.

In use, the thermochromatic display apparatus 20 can include a driving circuit (not shown) to drive the thermochromatic display apparatus 20 to display an image. The driving circuit can control the thermochromatic devices 220 through the electrode down-leads 204, 206 to display a dynamic image. A pixel can correspond to three thermochromatic devices 220 such as a first thermochromatic device has a red back color layer 226, a second thermochromatic device has a green back color layer 226, and a third thermochromatic device has a blue back color layer 226. Thus, the thermochromatic display apparatus 20 can display a chromatic image. The thermochromatic display apparatus 20 can be used in a field of advertisement billboard, newspaper, or electronic book.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A thermochromatic device, comprising:
an insulating substrate having a top surface;
a back color layer located on the top surface of the insulating substrate;
a color element, located on the a surface of the back color layer, comprising a transparence-changeable material;
a first heating element, wherein the first heating element comprises a carbon nanotube structure; and
a first electrode and a second electrode electrically connected to the first heating element.

2. The thermochromatic device of claim 1, wherein the color element and the first heating element are stacked on each other.

3. The thermochromatic device of claim 2, wherein the first heating element is located between the back color layer and the color element.

4. The thermochromatic device of claim 3, further comprising a second heating element located on the color element, wherein the first and second heating elements are parallel to each other and sandwich the color element.

5. The thermochromatic device of claim 2, wherein the first heating element is located on the color element.

6. The thermochromatic device of claim 1, wherein the first heating element is spaced from the color element and in contact with the first electrode and the second electrode.

7. The thermochromatic device of claim 1, wherein the insulating substrate has a recess defined on the top surface, and the back color layer and the color element are located in the recess.

8. The thermochromatic device of claim 1, wherein the phase change temperature is below 200° C.

9. The thermochromatic device of claim 1, wherein the transparence-changeable material comprises a mixture of polymer and fatty acid.

10. The thermochromatic device of claim 1, wherein the transparence-changeable material comprises a mixture of vinylidene fluoride hexafluoroacetone copolymer and low molecular weight poly methyl methacrylate.

11. The thermochromatic device of claim 1, wherein the transparence-changeable comprises poly(1.4-thiophenol-1.4-divinylbenzene).

12. The thermochromatic device of claim 1, wherein the carbon nanotube structure comprises at least one carbon nanotube film.

13. The thermochromatic device of claim 12, wherein a heat capacity per unit area of the at least one carbon nanotube film is less than $2\times10^{-4}$ $J/m^2\cdot K$.

14. The thermochromatic device of claim 12, wherein the at least one carbon nanotube film comprises a plurality of carbon nanotubes substantially oriented along a same direction that extends from the first electrode to the second electrode.

15. The thermochromatic device of claim 14, wherein the plurality of carbon nanotubes are joined end-to-end by Van der Waals attractive force therebetween.

16. The thermochromatic device of claim 1, wherein the carbon nanotube structure comprises at least one carbon nanotube wire; the at least one carbon nanotube wire is twisted carbon nanotube wire or untwisted carbon nanotube wire.

17. An thermochromatic display apparatus, comprising:
an insulating substrate;
a plurality of first electrode down-leads located on the insulating substrate, wherein the plurality of first electrode down-leads are substantially parallel;
a plurality of second electrode down-leads located on the insulating substrate, wherein the plurality of second electrode down-leads are substantially parallel, and the plurality of first electrode down-leads are set an angle relative to the plurality of second electrode down-leads to define a grid, and each two adjacent first electrode down-leads and each two adjacent second electrode down-leads of the grid define a plurality of cells; and
a plurality of thermochromatic devices, wherein each of the plurality of thermochromatic devices is located in each of the plurality of cells, and each of the plurality of thermochromatic devices comprises:
a back color layer located on the insulating substrate;
a color element, located on the a surface of the back color layer, comprising a transparence-changeable material;
a heating element, wherein the heating element comprises a carbon nanotube structure; and a first electrode and a second electrode electrically connected to the heating element.

18. The thermochromatic display apparatus of claim 17, further comprising a heat-resistant material located around each of the plurality of thermochromatic devices.

19. The thermochromatic display apparatus of claim 17, further comprising a protecting layer located on the insulating substrate to cover the plurality of first electrode down-leads, the plurality of second electrode down-leads and the plurality of thermochromatic devices.

20. An thermochromatic display apparatus, comprising:
 a plurality of thermochromatic devices arranged to form a pixel matrix, and each of the plurality of thermochromatic devices comprises:
  an insulating substrate having a top surface;
  a back color layer located on the top surface of the insulating substrate;
  a color element, located on a surface of the back color layer, comprising a transparence-changeable material, wherein the transparence-changeable material performs a transformation between a transparent state and a nontransparent state at a phase change temperature;
  a heating element, wherein the heating element comprises a carbon nanotube structure; and
  a first electrode and a second electrode, electrically connected to the heating element;
 a driving circuit; and
 a plurality of lead wires electrically connecting the driving circuit and the plurality of thermochromatic devices.

\* \* \* \* \*